No. 895,592. PATENTED AUG. 11, 1908.
B. M. STILES.
STOCK WATERING FOUNTAIN.
APPLICATION FILED AUG. 23, 1907.
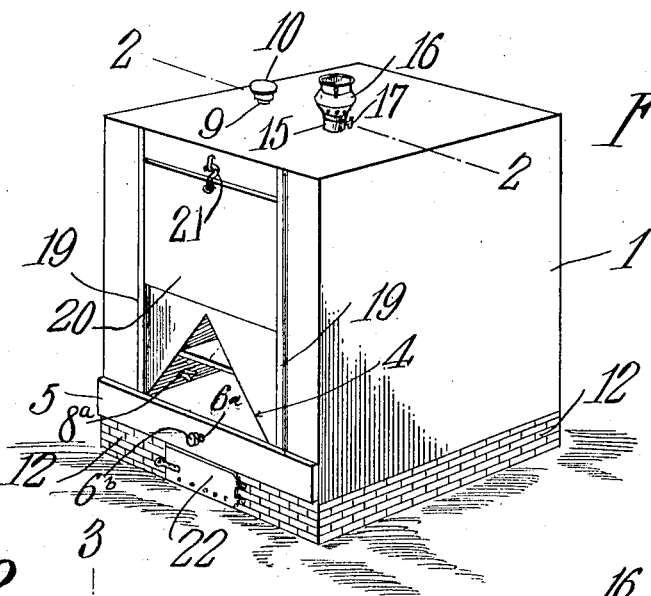
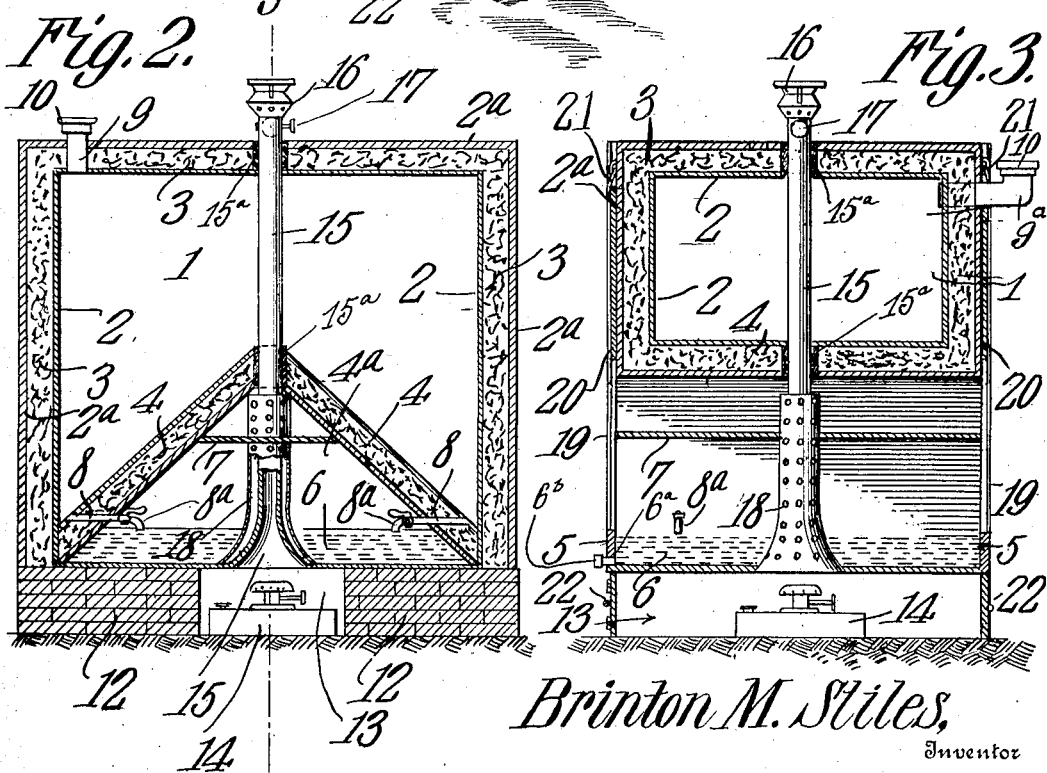
Brinton M. Stiles,
Inventor
By C. A. Snow & Co.
Attorneys
Witnesses

UNITED STATES PATENT OFFICE.

BRINTON M. STILES, OF BRAINARD, NEBRASKA.

STOCK-WATERING FOUNTAIN.

No. 895,592.  Specification of Letters Patent.  Patented Aug. 11, 1908.

Application filed August 23, 1907. Serial No. 389,894.

*To all whom it may concern:*

Be it known that I, BRINTON M. STILES, a citizen of the United States, residing at Brainard, in the county of Butler and State of Nebraska, have invented a new and useful Stock-Watering Fountain, of which the following is a specification.

This invention relates to a fountain at which stock of all kinds may drink at all seasons, the water therein being kept at a moderate temperature.

The object of the invention is to provide in a compact form a storage tank for a large quantity of water, and a drinking trough near the ground into which the water is fed from the tank automatically, and by such means that the same depth of water will be maintained constantly in the trough.

Another object of the invention will be found in the means for heating the water both in the tank and in the trough by the same heating device.

With these and other objects in view, the invention comprises the various novel features of construction and combination and arrangement of parts, which will be hereinafter more fully described, and pointed out particularly in the appended claims.

In the accompanying drawing:—Figure 1 is a perspective view of the improved fountain. Fig. 2 is a vertical cross section on the line 2—2 of Fig. 1. Fig. 3 is a vertical section on the line 3—3 of Fig. 2.

Corresponding parts in the several figures are indicated throughout by similar characters of reference.

The stock fountain may be made of any shape or dimensions desired, but one form, that of a cube, being shown in the drawing.
The tank 1 in which water is stored is made of sheet metal 2 surrounded on its four sides and its top by a wooden casing $2^a$ between which and the metal lining 2 is a space filled with sawdust 3, or other non-conductor of heat. The bottom of the storage tank is approximately A-shaped and of similar construction as the rest of the tank, but having both inner and outer walls made of sheet metal with an interlining of sawdust.
The ends of the tank do not extend below the A-shaped bottom, thereby producing a triangular passage $4^a$ open to the air from end to end. Fastened to each end of the tank across the bottom of said passage $4^a$ is a strip 5 of sufficient height to form a shallow trough 6 within the passage and below the inclined bottom. Some distance above the level of the trough is a horizontal shelf 7 on which vessels containing food, such as milk and butter may be placed during warm weather.

Projecting through the bottom 4 from the tank into the passage $4^a$ just above the trough are two pipes 8, one on each side provided on their outer ends with faucets $8^a$. At the top of the tank is a tube 9 for the entrance of water, said tube having a cap 10 fitting it air tight. The tube 9 may project through the top, as shown in Fig. 1, or through the side of the tank close to the top as indicated by $9^a$ in Fig. 3.

When the tank is to be filled, the faucets $8^a$ are closed and the cap 10 removed from the pipe. Water is then poured into the tank until it is filled and runs out through the pipe 9. The cap is then replaced and made air tight so that as the water is allowed to flow out of the tank through the faucets, air cannot enter the tank except through the pipes 8. If, now, the faucets $8^a$ are opened, water will flow out through the pipes 8 with an intermittent movement caused by the entrance of air interrupting the current of the water. As soon as the trough 6 is filled, or reaches the mouths of the faucets $8^a$, water from the tank will cease to flow into the trough until enough has been taken therefrom by animals drinking, or otherwise, to lower the water level in the trough below the mouths of the faucets, when water will again flow from the tank until cut off by the rise of the water level in the trough. For the purpose of cleaning the trough 6 an outlet $6^a$ provided with a water tight cap $6^b$ is placed in one or both ends of said trough.

The fountain is built upon a foundation 12 which, in the case of large fountains, will be made of brick, cement, or other similar material, extending from one end of the tank to the other, leaving a space 13 at the center of the tank from end to end into which the heat generating means is placed.

Any suitable means may be used for generating heat, as, for instance, a lamp 14 which is introduced into the space 13 with its burner below a flue 15 extending vertically through the center of the trough 6, passage $4^a$, and the tank, out through the top of the fountain. The lower end of the flue 15 is flared so that an increased amount of heat can pass up through the flue, heating the water in the trough and in the tank and finally passing out through a cap 16 on the top of the flue outside the fountain. When the flue passes through the bottom 4 and the top of the tank, the flue is thoroughly incased in asbestos or other heat resisting material 15ª.
A damper 17 is placed in the pipe just above the top of the fountain to regulate the quantity of heat flowing through the flue 15. Surrounding the flue below the bottom 4 and within the passage 4ª is a perforated metal shield 18 to prevent animals from becoming burned about the head or face by contact with the flue while drinking. Because the space 13 containing the lamp is directly under the trough 6, the latter will receive the greatest amount of heat which is desirable from its exposed position.

Fastened vertically to the fountain at each end thereof and on each side of the triangular passage 4ª are vertical guide strips 19 in which a door 20 on each end is adapted to move vertically. The doors 20 are high enough to close the passage 4ª, when lowered, but when raised to their highest position and held by means of catches 21, the ends of the passage 4ª are opened and access to the shelf, tank and faucets made permissible.

At each end of the heat generating space 13 is a door 22 mounted on hinges and having perforations therein for the admission of air to the lamp.

From the above description, it will be noted that the stock watering fountain is a very simple and efficient structure in which water is kept at all seasons at an approximately uniform temperature. In winter a suitable heating device is used to prevent the water from freezing, while in summer the trough is covered by the tank through which a passage is left for the currents of air to pass from one end to the other. The walls of the tank on the upper side of the passage are made double and lined with some non-conducting material which will, in a great measure, prevent any increase in temperature of the water in the tank during warm weather and keep it from freezing in winter. The shelf 7 is a most convenient and valuable addition to the fountain, as it affords a safe place on which to place crocks of milk to be kept cool by the air flowing past them.

What is claimed is:—

1. A stock watering fountain comprising a storage tank having an angular bottom beneath which is an open passage from one end of said tank to the other, a drinking trough extending from end to end of the passage at the bottom, and means for filling the trough from the tank as the water in said trough is lowered.

2. A stock watering fountain comprising a storage tank surrounded by a non-conductor of heat and having a doubly inclined bottom lined with a non-conductor of heat forming an open passage through the tank from end to end, a watering trough at the bottom of said passage extending from end to end of the tank, means for delivering water from the tank as it becomes exhausted from the trough, a flue extending from the bottom of the tank through the top and centrally disposed therein, and a heat generator opening into said flue.

3. A stock watering fountain comprising a storage tank, and a watering trough at the bottom of said tank, an angular bottom for said tank extending above said trough and forming a passage open at each end, a flue extending vertically through said trough, passage and tank to the outer air, a heat generator below said tank and opening into the bottom of said flue, and a perforated metal guard surrounding the lower end of said flue.

4. A stock watering fountain comprising a storage tank having an angular bottom, a watering trough, outlet pipes for the water extending from the tank through the angular bottom and entering said trough, a flue extending vertically through the fountain and above its top, the lower end of said flue being flared, a heat generator beneath said flared end of the flue, and a damper near the upper end.

5. A stock watering fountain comprising a storage tank with an inset bottom below which the ends of the tank are removed to form a passage open from end to end, a watering trough in the bottom of the passage, means for delivering water from the tank to the trough, a non-conducting covering for the tank to keep the temperature therein below the normal during warm weather, and a heating system to raise the temperature when the weather is cold.

In testimony that I claim the foregoing as my own, I have hereto affixed my signature in the presence of two witnesses.

BRINTON M. STILES.

Witnesses:
W. H. MODLIN,
JOHN BURKY.